INVENTORS
HELMUT KIESOW
HEINZ D. PURPS
BY
Frank R. Jifani
AGENT

INVENTORS
HELMUT KIESOW
HEINZ D. PURPS
BY
AGENT

United States Patent Office 3,453,454
Patented July 1, 1969

3,453,454
BISTABLE TRIGGER CIRCUIT

Helmut Kiesow, Hamburg-Lokstedt, and Heinz Dieter Purps, Hamburg-Garstedt, Germany, assignors by mesne assignments, to U.S. Philips Corporation, New York, N.Y., a corporation of Delaware Filed Oct. 22, 1965, Ser. No. 501,248
Claims priority, application Germany, Nov. 28, 1964, P 35,580
Int. Cl. H03k 3/26
U.S. Cl. 307—292 3 Claims

ABSTRACT OF THE DISCLOSURE

A quasi-stable trigger arrangement including a pair of transistors cross coupled with a pair of back to back diodes connected in poled opposition in each cross couple path, each path including an RC termination.

This invention relates to electronic devices having two transistors, which as the bistable trigger, have two stable conditions (one transistor conducting and one transistor cut-off). However, it is necessary to obtain a third condition in which both transistors are conducting and which is referred to as "quasi-stable." As in the monostable trigger, this third condition is limited in time and may be made variable at will by means of an adjustable time-constant.

It is known to obtain such switching functions by combinations of bistable and monostable triggers. However, extensive construction groups then result. Furthermore, monostable triggers are usually controlled by pulses whereas, for reasons of lower sensitivity to perturbations, it is often necessary to control switching functions by static potentials and potential jumps.

It is also known to control electronic switches (valves, transistors) through RC-elements so that the output voltage jump is delayed with respect to the input voltage jump. Inverse output jumps with guarantee of the above-mentioned "quasi-stable condition" may then also be obtained only by additional use of bistable triggers and large coupling elements.

The circuit arrangement according to the invention avoids all these disadvantages since it concerns a statically controlled bistable trigger in which the reverse change of polarity of the control voltage at the inputs switches one of the two outputs of the trigger immediately, but the other only after the delay period, whereby each time one of the trigger stages assumes the quasi-stable intermediate condition in which both transistors are conducting during the delay period and for the duration of the delay period.

The bistable transistor trigger circuit according to the invention has a diode coupling between the collector of each transistor and the base of the other transistor. It is characterized in that each coupling branch includes two diodes connected in opposition and the common point of which is connected to an RC-element, the resistor of which is connected to a fixed potential.

With respect to combinations of monostable and bistable trigger stages, which often do not allow of a static control, and in addition to the advantage of the considerably lower cost, the invention provides the special advantage of a lower sensitivity to perturbations due to the static control. Another advantage is the adjustability of the time-constant of the quasi-stable condition.

In order that the invention may be readily carried into effect several embodiments thereof will now be described in detail, by way of example, with reference to the accompanying diagrammatic drawings, in which.

Figure 1:
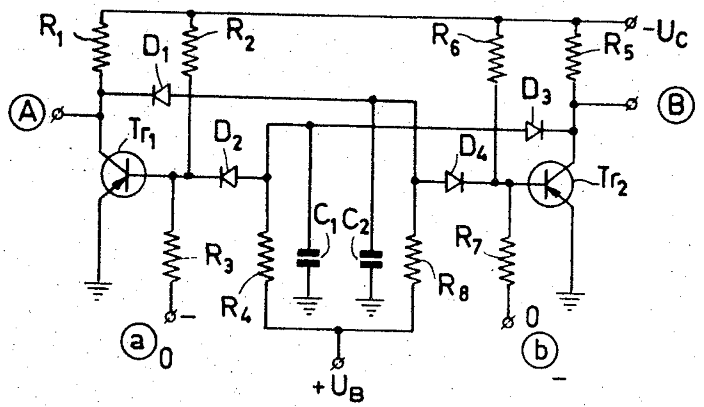
FIG. 1 shows a circuit arrangement according to the invention.

Let it be assumed that point $a$ of FIG. 1 has a negative voltage and that the voltage at $b$ is zero, then $Tr_1$ receives base current through $R_2$ and $R_3$ and is conducting. The low knee voltage (saturation voltage) of the transistor is set up at the collector of $Tr_1$. $D_1$ is a silicon diode of high knee voltage. A capacitor $C_2$ has a slightly positive voltage relative to earth since it is connected through $R_8$ to $+U_B$. However, the capacitor cannot be charged to $+U_B$ since $D_1$ keeps it at a low positive level corresponding to the knee voltage. However, this level is positive enough to make $D_4$ conducting. The current supplied through $R_6$ does not therefore flow through the base of $Tr_2$ but through $D_4$ and $R_8$ to $+U_B$. The base of $Tr_2$ is slightly positive so that $Tr_2$ is cut off. However, this means, that the collector of $Tr_2$ has a negative potential ($-U_c$) and that $C_1$ is negatively charged through $D_3$ and $D_2$ is cut off. The base of $Tr_1$ thus receives the total (negative) current supplied through $R_2$ and $R_3$. If, now, the negative control voltage $a$ is switched off, the condition of $Tr_1$ does not change at all since the current flowing through $R_2$ is alone also capable of overcontrolling $Tr_1$.

Figure 2:
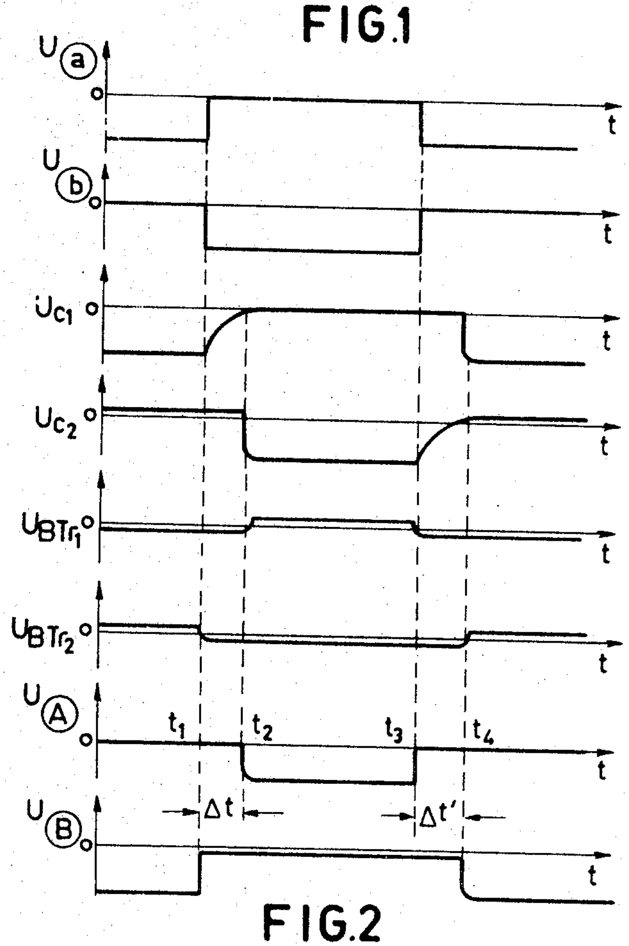
FIG. 2 shows the corresponding pulse diagram.

The condition of the circuit arrangement does not change until a negative voltage is applied to $b$ (at the instant $t_1$ in FIG. 2). Then the sum of the (negative) currents flowing from $-U_c$ through $R_6$ and from $b$ through $R_7$ exceeds the (positive) current supplied through $R_8$ from $+U_B$, that is to say a base current flows from the base of $Tr_2$. Consequently the transistor $Tr_2$ becomes conducting and the voltage at B jumps back to the remaining collector-emitter voltage. A capacitor $C_1$ now discharges through $R_4$. $Tr_1$ remains conducting until $C_1$ has been recharged to a slightly positive voltage; $D_2$ then becomes conducting and the base current flows off through $R_4$ and $D_2$, that is to say $Tr_1$ is cut off after the delay period $\Delta t$ at the instant $t_2$.

The circuit now assumes the condition which is opposite to the initial condition. If, now, the voltage at $a$ again becomes negative and zero at $b$—instant $t_3$—the process takes place in the reverse direction, that is to say after the delay period $\Delta t'$ the circuit changes-over again to the initial condition at the instant $t_4$. From the description of the switching function it may be seen that between the two conditions "$Tr_1$ conducting," "$Tr_2$ cut-off" and "$Tr_1$ cut-off," "$Tr_2$ conducting" there always arises the quasi-stable condition "$Tr_2$ conducting," "$Tr_1$ conducting" for the duration of $\Delta t$ and $\Delta t'$. Consequently the circuit has three conditions. The calculable duration of the quasi-stable condition is given by the time in which the capacitor $C_1$ (or $C_2$) discharges from $-U_c$ to zero volts. The arrangement may be used in all cases where two processes must be switched by means of voltage jumps so that a certain buffer time invariably exists between the switching-off of one process and the switching-on of the other, that is to say upon a change in potential of the control voltage at $a$ and $b$ respectively the outputs A and B respectively are not changed-over simultaneously but in a certain sequence one after the other and with a certain delay period.

Figure 3:
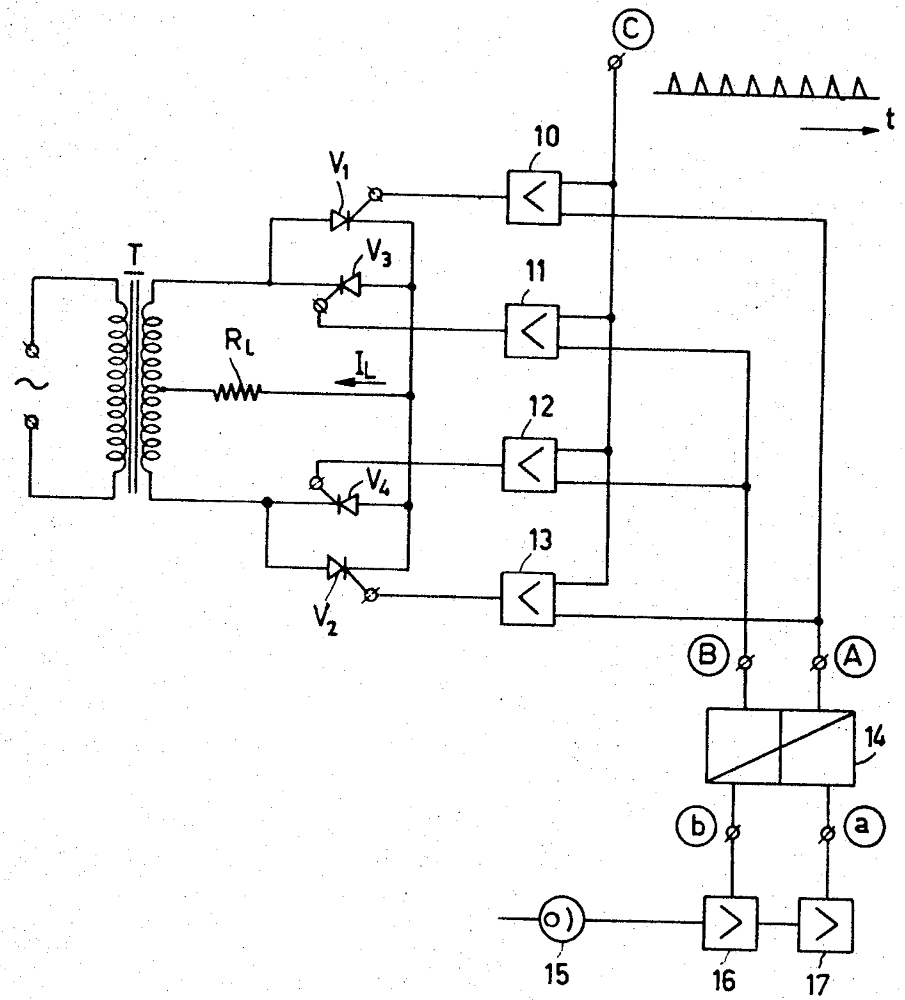
FIG. 3 shows an example for use of the circuit of FIG. 1 in the control of thyristors.

The arrangement according to the invention has been found very advantageous for the control of ignition circuits for thyristors. In thyristor groups connected in parallel opposition it must be ensured upon reversal of the direction of the load current, that the rectifiers of one direction of the current are not ignited before the other direction of the current is cut-off completely. The circuit arrangement according to the invention as described hereinbefore satisfies this requirement in a simple manner in the example shown in FIG. 3. A load resistor $R_L$, which is usually complex, is fed from a mains transformer T through thyristors $V_1$ to $V_4$. The load current $I_L$ is positive if $V_1$ and $V_2$ are conducting, and negative if $V_3$ and $V_4$ are conducting. The rectifiers are opened in known manner by means of igniting pulses at their control electrodes, it being possible to vary the value of the load current by suitable choice of the phase position of the igniting pulses relative to the alternating voltage from the mains.

The igniting pulses are provided by amplifiers 10, 11, 12, 13, which are controlled with a suitable sequence of pulses at C. Upon switching the current $I_L$ from the positive to the negative direction it is necessary to ensure that the rectifiers $V_3$ and $V_4$ are ignited only when $V_1$ and $V_2$ are actually cut-off. When using an inductive load $R_L$ allowance must be made for change-over of the output voltages of the rectifiers. However, this means that $V_1$ and $V_2$ are still conveying current in the next half cycle. If $V_3$ and $V_4$ were already opened in this period shortcircuit for the second side of the mains transformer T would occur through $V_1$ and $V_4$, and $V_2$ and $V_3$ respectively, resulting in deterioration of the rectifiers. If, however, the arrangement according to the invention (14) is used in such manner, that its output A is connected to the igniting pulse amplifiers 10 and 13 and its output B is connected to the igniting pulse amplifiers 11 and 12 and that these igniting amplifiers are cut-off when the output voltage at A and B respectively is zero, then the short-circuit via the rectifiers may be avoided with security. The control command for changing the direction of the load current may be given, for example, by a photoelectric cell 15 through amplifiers 16 and 17 to the inputs *a* and *b* of the arrangement 14. This arrangement then switches over, for example, at A directly and at B after the predetermined delay period, which in this case must be at least a half cycle of the alternating voltage of the mains.

For completing the invention it is possible—if the outputs A and B are connected together through a simple or-gate comprising two diodes (where $-U_c$ must be equal to L)—to produce pulses at *a* and *b* merely by the inverse change of the control voltages, said pulses having a width which is adjustable by corresponding proportioning of the time-constant $R_4/C_1$; $R_8/C_2$.

What we claim is:

1. A bistable transistor trigger circuit as claimed in claim 3 wherein the diodes connected to the collectors of the transistors are silicon diodes having a high knee-voltage.

2. A bistable transistor trigger circuit as claimed in claim 3 wherein each collector is connected to a pair of controllable current rectifiers through pulse-controlled amplifiers, one rectifier of one pair being connected in parallel opposition to the other rectifier of the other pair.

3. A bistable two transistor trigger circuit having a quasi-stable state of conductivity wherein both of said transistors are conductive for a predetermined delay period, comprising a first coupling path including a pair of oppositely poled series connected diodes having a first common junction point interconnecting the collector of one transistor and the base of the other, a second coupling path including another pair of oppositely poled series connected diodes having a second common junction point interconnecting the base of said one transistor and the collector of said other transistor, first and second resistors connected between a source of potential and said first and second common junction points respectively, said source of potential acting to forward bias all of said diodes and to reverse bias both of said transistors, and first and second capacitors connected between a reference point and said first and second junction points respectively.

References Cited

UNITED STATES PATENTS

| | | | |
|---|---|---|---|
| 3,067,336 | 12/1962 | Eachus | 307—292 |
| 3,134,030 | 5/1964 | Dao | 307—292 |
| 3,237,024 | 2/1966 | Mavity | 307—292 |

ARTHUR GAUSS, *Primary Examiner.*

J. D. FREW, *Assistant Examiner.*

U.S. Cl. X.R.

307—291, 293; 328—206